UNITED STATES PATENT OFFICE.

LEONHARD LEDERER, OF MUNICH, GERMANY.

PROCESS OF OBTAINING HYDROXYLIZED PHENYL ETHERS.

SPECIFICATION forming part of Letters Patent No. 606,930, dated July 5, 1898.

Application filed July 9, 1897. Serial No. 644,019. (No specimens.)

*To all whom it may concern:*

Be it known that I, LEONHARD LEDERER, a citizen of the Kingdom of Bavaria, German Empire, and a resident of 76ª Gabelsbergerstrasse, Munich, Bavaria, Germany, have invented certain new and useful Improvements in Processes of Obtaining Hydroxylized Phenyl Ethers from Mixtures, of which the following is a specification.

I have observed that hydroxylized phenyl ethers, however close they approach phenol in their other properties, have quite a specific action in regard to carbonate of potassium in that they possess the property of forming crystallized compounds with carbonate of potassium, a property absolutely lacking in phenol and its homologous derivates.

The compounds of carbonate of potassium with the acid ethers of phenol are stable in dry air, while by water they are partly decomposed. The presence of carbonate of potassium prevents decomposition. In alcohol and benzol they are soluble on being warmed, whereby they partially decompose. On cooling again they separate again in a crystallized form. Their composition can be expressed by the formula $R_2K_2CO_3$, R indicating an hydroxylized phenyl ether. This remarkable behavior of hydroxylized phenyl ethers in regard to carbonate of potassium can be very advantageously utilized for obtaining the former from mixtures with phenols, such as wood-tar oils, and other substances, like oil of cloves, guaiacol, creosol, ethylguajacol, and pyrogallic ether, have been separated in this manner.

According to this invention one part of fluid guaiacol is rubbed up with one part of carbonate of potassium with the addition of a little water. In proportion to the contents in guaiacol instantly or after a short time a crystalline oily mass forms, which after termination of the reaction is stirred up with ether, ligroin, or a similar solvent and is separated from the lye in suitable manner, such as by removing the liquid from the solid parts by exhaustion, by filter-press, or similar apparatus. By decomposing it with carbonic acid or diluted acids guaiacol is separated from the double compound, and by distilling it in a current of aqueous vapor it is freed from small quantities of resinous products. The preparation thus obtained is absolutely pure. It crystallizes merely by introducing a crystal of guajacol into the aqueous vapor distillate without requiring any further cooling.

If creosote is used, one part of creosote and two parts of a concentrated solution of potash are stirred up together for some time. The composition is allowed to settle. I then separate the watery part from the oil and stir the residue up with ether, whereby the compounds of carbonate of potassium are separated in crystalline form. After elimination of the lye the residue is decomposed and purified, as mentioned in connection with guajacol. A product is thus obtained which is absolutely free from monophenols.

If oil of cloves is used, one part of oil of cloves and one part of carbonate of potassium are stirred up for some time carefully with the addition of a little water. The mixture is, after reaction has taken place, mixed with ether, the lye eliminated as usual, and the crystalline residue treated as mentioned above.

Instead of the above the mixture of methyl and dimethyl hydroquinone, which, according to *Liebig's Annals of Chemistry*, Vol. 200, page 254, is obtained by heating hydroquinone with iodide of methyl and caustic potassium, is stirred up for some time with a concentrated solution of carbonate of potassium. After removing the watery part the residue is treated with a mixture of benzol and petrol ether.

The separated crystalline mass is collected on the filter and finally decomposed by diluted acids, whereby methyl-hydroquinone is separated in solid form.

Instead of mixing the compositions containing hydroxylized phenyl ether with carbonate of potassium they could also be dissolved in lye of caustic potash and the double combinations of carbonate of potassium prepared from this solution by introduction of carbonic acid.

The final treatment of the product of the reaction takes place in the manner mentioned. Besides the hydroxylized phenyl ethers can also be prepared in form of their combinations of carbonate of potassium by a protracted boiling with a solution of carbonate of potassium and subsequent introduction of carbonic acid.

I claim—

1. The herein-described process of obtaining hydroxylized phenyl ethers from mixtures which consists in bringing said mixtures into reciprocal action with carbonate of potassium, substantially as described.

2. The herein-described process of obtaining hydroxylized phenyl ethers from mixtures which consists in bringing said mixtures into reciprocal action with carbonate of potassium and then treating the resulting mixture with ether to dissolve the same, substantially as described.

In testimony that I claim the foregoing as my invention I have signed my name in presence of two witnesses.

LEONHARD LEDERER.

Witnesses:
CARL WILD,
EMIL HENZEL.